United States Patent
Takenaka et al.

[15] 3,667,283
[45] June 6, 1972

[54] MEANS FOR MEASURING THICKNESS OF SHEET MATERIAL

[72] Inventors: Haruo Takenaka, Tokyo; Hiroshi Okuyama, Kanagawa; Noburo Hibino, Kanagawa; Eiichi Ohta, Kanagawa, all of Japan

[73] Assignee: Fuji Photo Film Co., Ltd., Kanagawa, Japan

[22] Filed: May 1, 1970

[21] Appl. No.: 33,806

[52] U.S. Cl...........................73/37.7, 26/70, 250/219 TH
[51] Int. Cl.........................................................G01b 13/06
[58] Field of Search..................................73/37.5–37.7, 159, 73/150; 250/219 TH; 26/57 E, 70

[56] References Cited

UNITED STATES PATENTS

| | | | |
|---|---|---|---|
| 3,179,800 | 4/1965 | McNamara | 250/219 TH X |
| 2,656,845 | 10/1953 | Lindsay | 250/219 TH X |
| 3,185,024 | 5/1965 | McCreanor | 250/219 TH X |

Primary Examiner—Louis R. Prince
Assistant Examiner—William A. Henry, II
Attorney—Sughrue, Rothwell, Mion, Zinn and Macpeak

[57] ABSTRACT

A stationary thickness gauge is combined with a movable thickness gauge to measure the true thickness in the lateral direction of a running web or sheet material. The movable thickness gauge is moved in a direction transverse to the running direction of the web or sheet.

6 Claims, 4 Drawing Figures

MEANS FOR MEASURING THICKNESS OF SHEET MATERIAL

BACKGROUND OF THE INVENTION

1. Field of the Invention

The present invention relates to a means for measuring the true thickness of a running web or sheet material, and more specifically to a means for measuring the true thickness of a running web or sheet material in the lateral direction thereof.

2. Description of the Prior Art

In known conventional types of thickness measuring means, movable thickness meters have been used for measuring the thickness of a running web in the lateral direction thereof. The thickness meter is moved in a path transversely of (and rectangular to) the running direction of the web in such means. For such a type of thickness measuring means employed in producing sheets, film and the like, air-microgauge type thickness meters, strain gauge type thickness meters, supersonic type thickness meters, $\beta$-ray thickness meters and the like, have been used. Since the thickness meter as described above is moved in a path transversely of the running direction of the web, the scanning locus of the thickness meter on the running web is a skewed line. According to the measured thickness along the skewed line on the web, a profile of thickness in the lateral direction is obtained.

In accordance with the obtained thickness profile in the lateral direction of the web, the adjustable parameters of the producing machine may be controlled to obtain a web of uniform thickness in the lateral direction. For instance the temperature distribution in the lateral direction, the clearance between the upper and lower rollers or the cross angle of the rollers may be controlled in order to obtain a uniform thickness.

However, the control of the web thickness according to the thickness profile obtained by the lateral movement of the thickness meter as described above does not always result in a uniform thickness in the lateral direction.

In an actual sheet producing method utilizing an extruding screw type machine, there is a variation in thickness in the running direction of the sheet produced which is due, inter alia, to the variation in the speed of rotation of the extruding screw, mechanical vibrations, the eccentricity of the quench from axis, the back lash of the driving gear or the slip of the driving belt.

Any variation in tension of the running web caused by any difference in friction coefficient in the peripheral direction of the surface of the periphery of the idle roller causes a variation in thickness in the running direction of the web produced.

In addition to the above-described variation in thickness of the web in the running direction thereof, there is a variation in thickness of the web in a direction transverse to the running direction thereof. The variation in thickness in the lateral direction (i.e., a direction rectangular to the running direction) does not occur without positively varying the thickness in the lateral direction with some controlling means. Therefore, if there is no variation in thickness in the running direction of the web, the proper regulation of thickness can be achieved by controlling the thickness controlling means in accordance with the thickness profile obtained by performing the thickness measurement with a thickness meter scanning only in the lateral direction. However, since there is a variation in thickness in the running direction, it is impossible to properly control the thickness of the web by only operating the thickness controlling means in accordance with the thickness profile obtained by performing the thickness measurement with a thickness meter scanning the web only in the lateral direction. This occurs because the scanning meter is actually scanning the web skewly with respect to the running direction of the web, since the meter is being moved in a direction transversely of the running direction of the web.

A manner of resolving the above-described problem is to move the thickness meter diagonally with respect to the running direction of the web so that the component of the speed of scanning in the running direction is equal to the speed of running of the web. By moving the thickness meter as described above, the thickness meter is moved as a result relatively in the lateral direction of the web. Thus, the thickness of the web in the lateral direction is measured and the correct thickness profile is obtained. In accordance with the thickness profile thus obtained, the proper thickness controlling procedures can be chosen. However, the scanning speed of the thickness meter is generally limited by the response time of the thickness meter, noise and the like. Since the running speed of the web is comparatively large with respect to the possible speed of the scanning meter, the thickness meter is to be scanned in a direction inclined at a small angle to the running direction of the web. Accordingly, the path of the scanning thickness meter should be remarkably large. Therefore, a large space is required to carry out the above-described method. In some cases, it is impossible to carry out the above-described method of resolution.

Considering the drawbacks of the above-described conventional method of measuring the thickness of a running web, a new method of measuring the thickness of a moving web has long been sought after.

SUMMARY OF THE INVENTION

The present invention provides a means for measuring the thickness of a moving sheet material comprising a stationary thickness meter for measuring the thickness of a running web along the running direction thereof and a movable thickness meter movable in a direction transversely to the running direction of the web. The stationary thickness meter measures the thickness of the web in the running direction and the movable thickness meter measures the thickness of the running web in the skewed direction.

Accordingly, by compensating the measured thickness of the web in the skew direction in accordance with the measured thickness of the web in the running direction, the true thickness profile along the lateral direction of the web can be obtained.

DESCRIPTION OF THE PREFERRED EMBODIMENTS

Figure 1:
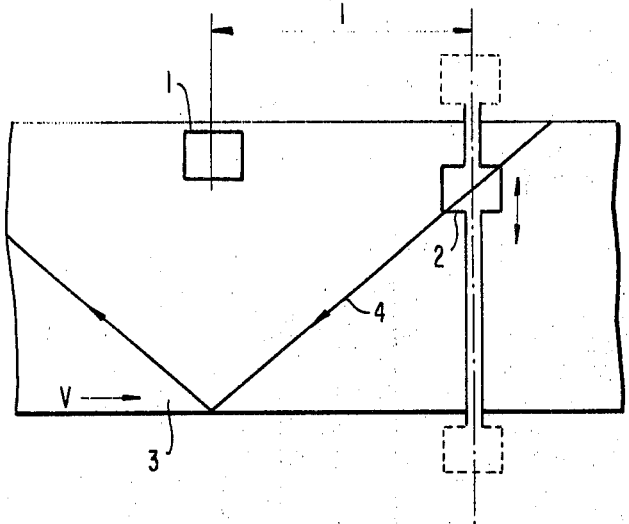
FIG. 1 is a plan view of the means for measuring the thickness of a moving sheet material in accordance with the present invention.

Referring now to FIG. 1, reference numeral 1 indicates a stationary thickness meter, 2 indicates a movable thickness meter, and 3 indicates a running web which moves in a direction from left to right in the drawing. The movable thickness meter 2 moves in a direction rectangular to the running direction, i.e., in the lateral direction of the web 3. The locus of the movable thickness meter 2 on the running web 3 is shown by the skew line 4.

Figure 2:
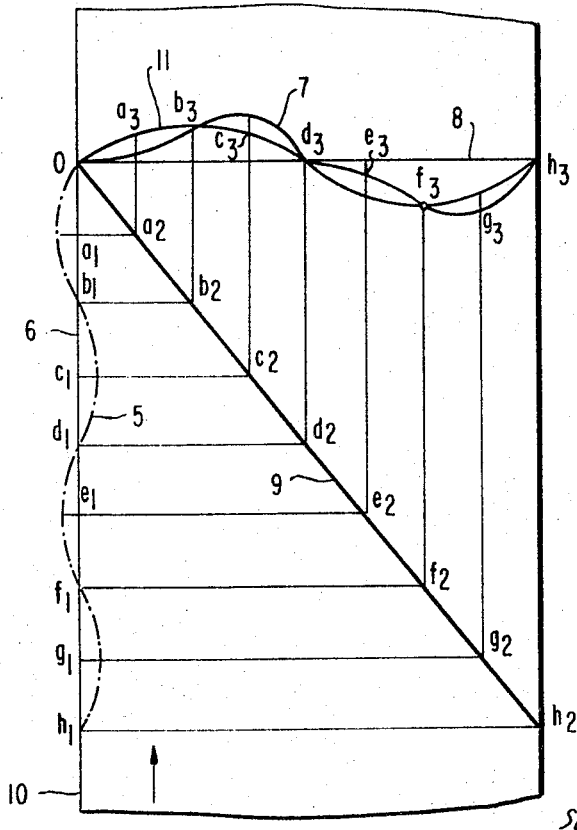
FIG. 2 is a diagram showing the principle of the method of measuring the thickness of the running web in accordance with the present invention.

Referring to FIG. 2, 5 indicates a profile of the web thickness along the running direction of the web 3 obtained by the thickness meter 1. The straight line 6 represents the average of the thickness of the web in the longitudinal direction measured by the thickness meter 1.

The numeral 7 indicates a profile of the thickness along the skew line 4 of the web 3 measured by the movable thickness meter 2. The numeral 8 indicates the average of the thickness measured by the movable thickness meter 2. The numeral 9 indicates the locus of the movable thickness meter 2 as it moves on the running web 3. That is, the points $0, a_2, b_2, \ldots g_2, h_2$ are the points where the thickness of the web 3 is measured and the profile of thickness 7 is obtained by projecting the measured thickness at the measuring points on line 9 onto the lateral line 8.

The numeral 10 indicates the running web moving in the direction shown by the arrow. The numeral 11 indicates a profile of the thickness drawn by the method of the present invention. This profile 11 shows the true thickness profile along the lateral direction of the web. According to the drawn thickness 11 of the present invention, the thickness along the lateral direction of the web can be controlled so as to be constant, and thus a uniform thickness can be obtained.

The manner of forming the correct profile 11 of the web thickness in accordance with the present invention will now be described in detail.

The thickness profile 11 is obtained by substracting the thickness profile 5 along the running direction of the web measured by the stationary thickness meter 1 from the thickness profile 7 along the skew line 4 on the web measured by the movable thickness meter 2. That is, since the thickness at the measuring points $0_1, b_1, d_1, f_1, h_1$ on the profile 5 to be subtracted from the profile 7 is zero, the true profile of the thickness obtained has a thickness equal to the measured thickness on the profile 7 along the skew line 4, measured by the thickness meter 2; $0; b_3; d_3; f_3; h_3$.

At the measuring points $a$ and $e$, since the thickness along the running direction shown by the profile 5 is smaller than the average, $a_1$ and $e_1$, the true thickness obtained by subtracting the profile 5 from the profile 7 becomes larger than profile 7. Thus, a thickness larger than the measured thickness is obtained as indicated by $a_3$ and $e_3$ on the profile 11. At the measuring points $c$ and $g$, since the thickness along the running direction shown by the profile 5 is larger than the average as shown at $c_1$ and $g_1$, the true thickness obtained by subtracting the profile 5 from the profile 7 becomes smaller than the profile 7. Thus, a thickness smaller than the measured thickness is obtained at the points $c_3$ and $g_3$. The profile 11 of the thickness thus obtained provides the true thickness along the lateral direction of the web.

Of course, the assumption that the thickness profile 11 thus obtained provides the true thickness along the lateral direction of the web is based on the experimental results that the thickness variation along the running direction of the web is equally measured at each point along the lateral line of the web.

Figure 3:
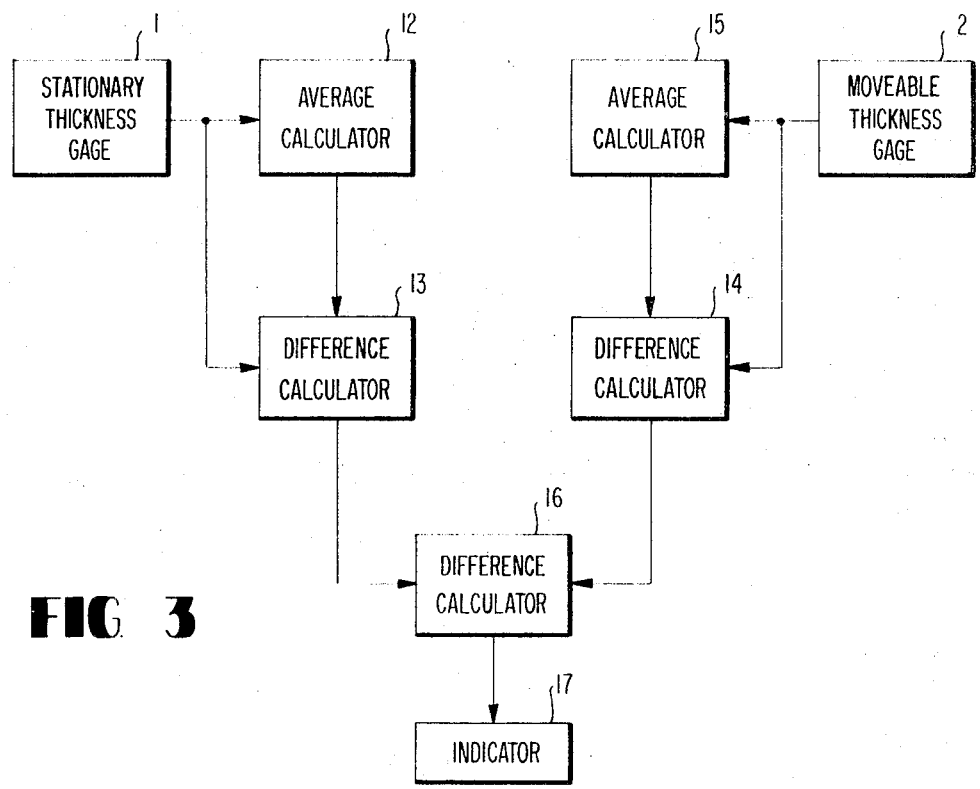
FIG. 3 is a block diagram showing the apparatus for calculating the thickness of the moving sheet of material in accordance with the present invention.

FIG. 3 is a block diagram showing the apparatus for calculating the true thickness of a moving sheet of material. The output of stationary thickness gauge 1 is applied to average calculator 12 which calculates the average value of the thickness of the material along the longitudinal direction of the material. The output of average calculator 12 corresponds to line 6 which is the average of profile 5 in FIG. 2. The output of average calculator 12 is applied to difference calculator 13 along with the output of the stationary thickness gauge 1. Difference calculator 13 calculates the difference between profile 5 and average 6 shown in FIG. 2. The output of movable thickness gauge 2 is applied to average calculator 15 which calculates the average value of the thickness of the material as measured by movable thickness gauge 2. This corresponds to line 8 in FIG. 2 which is the average value of profile 7. The output of the average calculator 15 and the output of movable thickness gauge 2 are applied to difference calculator 14 which calculates the difference between average value 8 and profile 7 in FIG. 2. The output of difference calculators 13 and 14 are applied to a difference calculator 16 which calculates the difference between these two outputs. The output of difference calculator 16 corresponds to profile 11 shown in FIG. 2. The output of difference calculator 16, which is profile 11, may be applied to a suitable indicator 17.

More preferably, the true thickness of the running web along the lateral direction thereof can be measured as follows. If the two points on one lateral line of the running web are measured and the thicknesses thereof are compared, the thickness profile along the lateral direction of the web can be obtained by continuously measuring the two points at various positions. Since the stationary thickness meter 1 measuring the thickness of the web 3 along the longitudinal direction thereof is spaced apart from the movable thickness meter 2 in the running direction of the web by the distance 1, a means for memorizing the measured thickness for some time is required. Since the web 3 is running at a constant speed $v$ from the stationary thickness meter side of the movable thickness meter side, the time for the web 3 to travel from the stationary thickness meter 1 to the movable thickness meter 2 is $l/v$. Therefore, it is possible to compare the two points on one lateral line of the web 3 and to get the true thickness profile along the lateral direction if the measured thickness of the web measured by the stationary thickness meter is memorized and reproduced after the time $l/v$.

The thickness measured by the stationary thickness meter 1 is memorized by a magnetic recording system and reproduced after the above-described time. By comparing the reproduced thickness measured by the stationary thickness meter 1 with the thickness measured by the movable thickness meter, measuring the thickness at the point on the lateral line on which the point where the thickness was measured by the stationary thickness meter exists, the true thickness profile in the lateral direction can be obtained. By continuously making the above-described operation (comparing the thickness measured by the stationary thickness meter with the thickness measured by the movable thickness meter moved along a direction rectangular to the running direction of the web) the correct thickness profile representing the thickness along the lateral direction of the web can be obtained even if the thickness varies in a direction along the running direction of the web.

In order to reproduce the measured thickness after the prescribed time, e.g., $l/v$, and in order to subtract the thickness measured by the stationary thickness meter 1 from the thickness measured by the movable thickness meter 2 as shown in FIG. 1, various conventionally known types of electrical methods can be employed. For instance, the thickness profile is converted into the magnitude in voltage as an analog value and the analog value is in turn converted into a digital value such as a frequency so as to be memorized in a magnetic tape, magnetic disc, magnetic drum, and the like, and to be reproduced after the time $l/v$. Then the reproduced digital value is reversely converted into the voltage and the voltage operates a proper electric circuit for operation of the mechanism.

It is apparent that the thickness measuring means in accordance with the present invention is duly operated even if the positions of the stationary thickness meter and the movable thickness meter are reversed. Even if the variation in thickness of the web in the running direction is small and the gradient of thickness variation is small enough, it is possible to operate the true thickness of the web in the lateral direction without using any recording means for memorizing the measured thickness by disposing the two thickness meters in close relationship. That is, by making the above-described distance $l$ as small as possible, there becomes no need to memorize and reproduce the measured thickness.

The preset invention is also applicable to measure the thickness profile in the lateral direction of a coated layer. In coating a sheet with a coating layer while continuously feeding the sheet, it is very difficult to maintain the thickness of the coating layer uniform in the lateral direction as well as in the longitudinal direction. In such a case, by disposing the stationary thickness meter on the uncoated sheet material and disposing the movable thickness meter above the coated sheet material, it is possible to measure the thickness of the uncoated sheet material and the coated sheet material separately. It is possible, accordingly, to obtain the thickness profile of the coated layer in the lateral direction by operating the difference in thickness between the uncoated sheet thickness and the coated sheet thickness.

Figure 4:
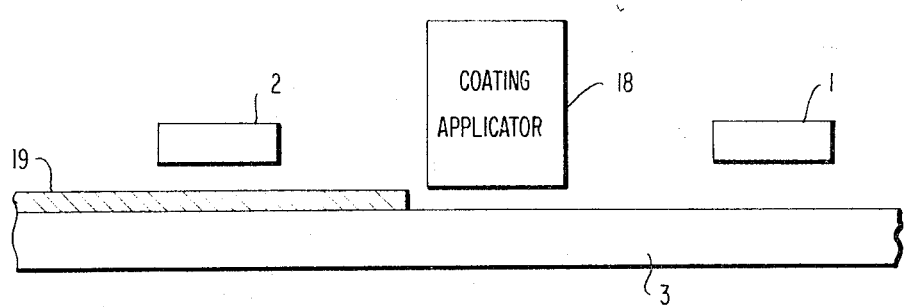
FIG. 4 is a diagram showing the apparatus for measuring the thickness of a coating on a sheet of moving material in accordance with the present invention.

FIG. 4 illustrates the manner in which the present invention may be used to measure the thickness profile in the lateral direction of a coated layer. Stationary thickness gauge 1 is positioned over an uncoated portion of movable material 3. As the material passes coating applicator 18 a coating 19 is applied to the upper surface of material 3. The movable thickness gauge 2 is positioned above the coated portion of movable material 3. In this manner it is possible to obtain the thickness profile of the coated layer in the lateral direction by connecting stationary thickness gauge 1 and movable thickness gauge 2 into the circuit shown in FIG. 3.

What is claimed is:

1. Apparatus for measuring the thickness of an advancing continuous sheet material comprising:
    a. stationary thickness gauge means for measuring the thickness of said sheet as said sheet advances past said stationary thickness gauge means in the longitudinal direction;
    b. first calculating means, coupled to the output of said stationary thickness gauge means, for calculating the average value of the output of said stationary thickness gauge means;
    c. second calculating means, coupled to the output of said stationary thickness gauge means and the first calculating means, for calculating the difference between the outputs of the stationary thickness gauge means and the first calculating means;
    d. movable thickness gauge means adapted to move in a direction transverse to the direction of movement of the advancing sheet for measuring the thickness of said advancing sheet;
    e. third calculating means, coupled to the output of said movable thickness gauge means, for calculating the average value of the output of the movable thickness gauge means;
    f. fourth calculating means, coupled to the output of said movable thickness gauge means and said third calculating means, for calculating the difference between the outputs of the movable thickness gauge means and the third calculating means; and
    g. fifth calculating means, coupled to the output of said second calculating means and said fourth calculating means, for calculating the difference between the outputs of the second calculating means and the fourth calculating means whereby the output of the fifth calculating means is equal to the true thickness of said continuous sheet.

2. Apparatus for measuring the thickness of a sheet material as defined in claim 1, wherein said stationary thickness gauge means is separated from said movable thickness gauge means in the longitudinal direction of said advancing sheet material, and wherein said apparatus further includes a means for memorizing a first measured thickness and reproducing said first measured thickness after a predetermined time so that said first measured thickness may be compared with a second measured thickness at a point on the same lateral line of said advancing sheet material as that at which said first measured thickness was measured.

3. Apparatus for measuring the thickness of a sheet material as defined in claim 1, wherein said stationary thickness gauge means is disposed in close relationship with said movable thickness gauge means.

4. Apparatus for measuring the thickness of a sheet material as defined in claim 1 further including coating means for applying a coating layer to said sheet material wherein said stationary thickness gauge means measures the thickness of said material prior to the application of said coating and said movable thickness gauge means measures the combined thickness of said material and said coating whereby said apparatus measures the true thickness of said coating.

5. A method for measuring the thickness of an advancing continuous sheet material comprising the steps of:
    a. measuring the thickness of said sheet with a stationary thickness gauge means as said sheet advances past said stationary thickness gauge means in the longitudinal direction;
    b. calculating the average value of the output of said stationary thickness gauge means;
    c. calculating a first difference equal to the difference between the output of said stationary thickness gauge means and the calculated average of the output of the stationary thickness gauge means;
    d. measuring the thickness of said advancing sheet with a movable thickness gauge means adapted to move in a direction transverse to the direction of movement of the advancing sheet;
    e. calculating the average value of the output of said movable thickness gauge means;
    f. calculating a second difference equal to the difference between the output of the movable thickness gauge means and the calculated average of the output of the movable thickness gauge means; and
    g. calculating a third difference equal to the difference between said first difference and said second difference whereby said third difference is equal to the true thickness of said continuous sheet.

6. Apparatus for measuring the thickness of a coated layer comprising a stationary thickness gauge means disposed on an uncoated portion of a continuous advancing sheet material, and a movable thickness gauge means disposed on a coated portion of said sheet material calculating means coupled to said stationary thickness gauge means and said movable thickness gauge means for calculating the true thickness of said sheet material with said coated layer.

* * * * *